(12) United States Patent
Leybourn

(10) Patent No.: US 11,083,256 B2
(45) Date of Patent: Aug. 10, 2021

(54) NEAR FIELD COMMUNICATION RING

(71) Applicant: KWI Group Ltd, Hertfordshire (GB)

(72) Inventor: Dean Leybourn, Greater London (GB)

(73) Assignee: KWI Group Ltd, Hertfordshire (GB)

( * ) Notice: Subject to any disclaimer, the term of this patent is extended or adjusted under 35 U.S.C. 154(b) by 52 days.

(21) Appl. No.: 16/321,778

(22) PCT Filed: Jul. 31, 2017

(86) PCT No.: PCT/EP2017/069355
§ 371 (c)(1),
(2) Date: Jan. 29, 2019

(87) PCT Pub. No.: WO2018/020055
PCT Pub. Date: Feb. 1, 2018

(65) Prior Publication Data
US 2019/0387848 A1    Dec. 26, 2019

(30) Foreign Application Priority Data

Jul. 29, 2016 (GB) .................................. 1613117

(51) Int. Cl.
*H01Q 1/27* (2006.01)
*A44C 9/00* (2006.01)
(Continued)

(52) U.S. Cl.
CPC ........ *A44C 9/0053* (2013.01); *G06K 19/0723* (2013.01); *H01Q 1/273* (2013.01);
(Continued)

(58) Field of Classification Search
CPC ............ A44C 9/0053; G06K 19/0723; G06K 19/041; G06K 19/07722; G06K 19/07724;
(Continued)

(56) References Cited

U.S. PATENT DOCUMENTS

2007/0008140 A1* 1/2007 Saarisalo ........... G06K 7/10178
340/572.7
2014/0253127 A1* 9/2014 Leussler ........... G01R 33/34046
324/322
(Continued)

FOREIGN PATENT DOCUMENTS

CN    204013533 U    12/2014
CN    204409802 U    6/2015
(Continued)

OTHER PUBLICATIONS

Intellectual Property Office of United Kingdom; "Search Report under 17 Section 1 from GB application No. 1613117.9, dated Dec. 21, 2016"; pp. 2; Published: GB.
(Continued)

*Primary Examiner* — Awat M Salih
(74) *Attorney, Agent, or Firm* — Polsinelli LLP

(57) ABSTRACT

A near field communication ring that can be read by nearby NFC-enabled devices. The ring comprises an annular shell and a near field communication transponder mounted on the annular shell. The near field communication transponder has a coil antenna that has a plurality of turns that each extend around the entire circumference of the annular shell. The rings has various potential applications including, for example, contactless payment, ticketing on mass transit systems, operation of NFC door locks or other access systems, identity authentication, venue or event entry/ticketing and the sharing of information with NFC-enabled smartphones.

21 Claims, 4 Drawing Sheets

(51) Int. Cl.
*G06K 19/07* (2006.01)
*H04B 5/00* (2006.01)
*H01Q 7/00* (2006.01)

(52) U.S. Cl.
CPC .......... *H04B 5/0031* (2013.01); *H04B 5/0068* (2013.01); *H04B 5/0081* (2013.01); *H01Q 7/00* (2013.01)

(58) Field of Classification Search
CPC ....... G06K 19/07758; G06K 19/07762; G06K 19/07783; G06K 19/0779; G06K 19/07781; H04B 5/00; H04B 2001/3861; H04B 5/0031; H04B 5/0068; H04B 5/0081; H04W 4/80; G06Q 20/3278; H01Q 1/2208; G07C 9/28
See application file for complete search history.

(56) References Cited

U.S. PATENT DOCUMENTS

| | | |
|---|---|---|
| 2014/0285416 A1 | 9/2014 | Priyantha et al. |
| 2015/0042450 A1 | 2/2015 | McLear |
| 2016/0020832 A1* | 1/2016 | Ting .................... H04B 5/0031 455/41.1 |
| 2016/0156603 A1 | 6/2016 | Janik |
| 2016/0171201 A1 | 6/2016 | Schroder |

FOREIGN PATENT DOCUMENTS

| | | |
|---|---|---|
| CN | 104780728 A | 7/2015 |
| DE | 19824643 A1 | 11/1999 |
| DE | 102006061298 A1 | 6/2008 |
| WO | 00/07834 A2 | 2/2000 |
| WO | 2013/188977 A2 | 12/2013 |
| WO | 2015/067289 A1 | 5/2015 |

OTHER PUBLICATIONS

International Searching Authority; "International Search Report & Written Opinion from PCT application No. PCT/EP2017/069355, dated Nov. 6, 2017"; pp. 13; Published: EP.

\* cited by examiner

NEAR FIELD COMMUNICATION RING

CROSS-REFERENCE TO RELATED APPLICATIONS

This application is a U.S. National Stage of PCT Application No. PCT/EP2017/069355, filed Jul. 31, 2017, which claims priority to GB Application No. 1613117.9, filed Jul. 29, 2016, the entire contents of each of which are incorporated herein by reference in their entirety for all purposes.

FIELD OF INVENTION

This invention relates to near field communication (NFC) rings that can be read by nearby NFC-enabled devices. Rings in accordance with the embodiments of the present invention have various potential applications including contactless payment, ticketing on mass transit systems, operation of NFC door locks or other access systems, identity authentication, venue or event entry/ticketing and the sharing of information with NFC-enabled smartphones for example. The ring may be a ring for a user to wear on their finger. Alternatively, the ring may be sized to wear around e.g. the user's wrist (as a bracelet).

BACKGROUND

Near field communication (NFC) can be used for one- and two-way communication between two devices when held in close proximity to one another (typically within about 4 cm of one another). The standards defining NFC communications protocols are well known to the skilled person.

Contactless smartcards using NFC or other short range RFID protocols have been in use for many years for applications including building access systems and, particularly over the last decade, for contactless ticketing on mass transit systems (e.g. London Transport's 'Oyster' card) and contactless payment (e.g. "MasterCard Contactless"). More recently, there has been a growing trend to use NFC-enabled smartphones in place of smartcards, especially for contactless payments.

Other alternatives to smartcards have also been proposed in recent times, for example using passive/unpowered NFC chips embedded in key fobs, tags, wristbands, rings and labels/stickers.

US 2015/0042450 (McLear) describes one example of a wearable NFC device, specifically a ring. The ring can be used to communicate with NFC-enabled devices, such as digital door locks (to unlock the door) and smartphones/tablets (e.g. to transfer data from the ring to the smartphone or tablet).

SUMMARY OF INVENTION

In general terms, the present invention proposes a near field communication (NFC) ring that can be worn by a user and can communicate with other NFC-enabled devices, for example to transact a payment, provide identification, unlock a door or transfer data. In particular, the invention proposes to use an NFC transponder that has a coil antenna with several turns that are wound on the inside of the ring and extend the whole way around the inner circumference of the ring. This form of antenna can provide improved coupling with other NFC-enabled devices compared with more conventional planar or curved NFC antennas.

In a first aspect, the invention provides a ring for wearing on a user's finger, the ring comprising an annular shell and a near field communication transponder mounted on the annular shell, wherein the near field communication transponder includes a coil antenna that has a plurality of turns that each extend around the entire circumference of the annular shell.

Typically, the near field communication transponder will be mounted within the annular shell and the turns of the coil antenna will extend around the inner circumference of the annular shell. Alternatively, however, the transponder could be mounted on the outside of the shell and the coils could extend around the outside of the annular shell, or components of the transponder could be mounted both within and on the outside of the annular shell.

In some embodiments, the coil antenna includes at least 5 turns, at least 8 turns or at least 10 turns, or more. The antenna can be approximately tuned by using an appropriate number of turns, based on the required diameter, with appropriate spacing between the turns. Fine tuning can be achieved using one or more capacitors in the transponder circuit.

In some embodiments the turns of the coil antenna are spaced from one another across the width of the ring. This provides a 'solenoid'-type antenna. In some embodiments, the turns are all equally spaced from one another. As noted above, the spacing between the turns can be selected to assist in tuning the antenna.

In some embodiments of the ring, a central portion of the inner surface of the annular shell is recessed (with respect to the edges of the ring) to form an annular channel within which the coil antenna can sit. This helps to accurately locate the coil antenna and also makes it easier to secure the antenna in place. In some embodiments the channel is symmetrical across the width of the ring, which means that the ring will perform equally well whichever way round it is worn.

In some embodiments, the NFC transponder, including the coil antenna, is secured in place and sealed from the surrounding environment (at least in a water-resistant or waterproof manner) by an annular cover (e.g. an inner, annular cover in the case where the coil antenna is within the shell), which may be a resin seal. Encapsulating the components of the NFC transponder in this way can help protect the components from dirt, damage and tampering, as well as water. This encapsulation between the inner cover (e.g. resin seal) and annular shell can be particularly effective in the case where the shell has an annular recess as discussed above so that the NFC transponder (and especially the antenna) are encapsulated within the recess.

The resin is preferably selected to have an inert nature, to be attractive to look at and scratch resistant. In some embodiments the resin is safe for food use and/or use in children's products. The resin is preferably non-toxic (when correctly mixed and fully cured) and will not cause a reaction on skin. One example of a suitable resin that can be used is a two component resin including the resin itself (e.g. a Bisphenol-A based epoxy, containing Polyglycidyl Ether) and a hardener (e.g. including a Cycloaliphatic Polyamine). The base form of the resin may be transparent. In some embodiments, a colourant is added to the resin mix to colour the resin with a desired level of opacity. The resin may be one that is specifically intended for use in jewelry and the decorative arts industries to mimic glass enamel. Typically such resins are very hard and have a distinctive vitreous nature, providing vivid and deep colours in the hardened material (and deliberately does not resemble plastic). Key attributes of resins (or other materials used for the annular cover) in some embodiments of the invention are one or more of: hardness, scratch-resistance, inertness, non-toxicity, attractiveness, colour/opacity flexibility and water-resistance.

In some embodiments, the annular shell is a ceramic, for example a Zirconia ceramic ($ZrO_2$). Other potentially suitable materials for the annular shell include: wood, plastic, glass, carbon fibre and solid resin. In some embodiments it may also be possible to use a suitably configured metal shell. Key attributes of the shell, in embodiments of the invention, typically include one or more of: high permeability to electromagnetic fields; low-conductivity; scratch-resistance; rigidity; hardness; water-resistance; and attractiveness.

The coil antenna can take any of a number of appropriate forms. It may, for example, be a wound metal (e.g. copper) wire coil. This type of antenna is inexpensive and simple but could lead to assembly problems.

A more preferable form of antenna is to form the coil antenna as a continuous conductive track carried on a flexible substrate (e.g. as a flexible PCB). The conductive track of the antenna could, for example, be printed or etched onto the substrate in a known manner. Taking this approach, the other components of the NFC transponder (including the NFC chip) can also be mounted on the flexible substrate. The flexible substrate, carrying the antenna and NFC chip, can have a cylindrical (i.e. ring shape) form of an appropriate diameter, so that it can easily be located within the annular shell of the ring. Especially in the case where the shell has an annular recess to locate the flexible substrate carrying the antenna, the flexibility of the substrate means that it can be flexed inwards past the lips of the recess and will then flex back into shape to retain itself within the recess even before the resin seal (or other cover) is applied.

Another possibility is to form the coil antenna directly on the inner surface of the annular shell. Any of several suitable forming processes may be employed, for example electroplating or laser direct structuring.

In some embodiments, the antenna is designed to be manufactured in a flat state and then rolled and ends of track sections on the flexible substrate connected together to form a continuous coil. In order to achieve this, a preferred form of the coil antenna includes a series of parallel track sections that extend circumferentially around the annular shell, with a tail end of one track section being joined to the leading end of an adjacent track section by a track step section that extends in a width direction across the annular shell. This track layout simplifies assembly of the antenna and enables better precision in the finished antenna as the tracks can easily be aligned when the flexible substrate is rolled into a cylinder. The same track layout can be used when forming the coil antenna directly on the surface of the annular shell.

In a second aspect, the invention provides a method of manufacturing a wearable ring, the method comprising:

providing an annular shell;

mounting a near field communication transponder on the shell, so that a coil antenna of the transponder extends all of the way around the circumference of the shell; and applying a cover over the transponder to encapsulate the transponder between the annular shell and the cover.

Rings manufactured in accordance with embodiments of this method may have one or any combination of two or more of the features discussed above in the context of the ring of the first aspect of the invention.

For example, the near field communication transponder may comprise a flexible substrate on which the coil antenna is formed, the step of mounting the transponder in the shell comprising positioning the flexible substrate within the annular shell.

Alternatively the step of mounting the transponder in the shell may comprise directly forming the coil antenna on the inner surface of the shell.

As noted above in the discussion of the first aspect of the invention, the annular shell may be ceramic and the cover may be a resin seal. The resin seal may be applied in liquid form over the transponder after the transponder is mounted within the annular shell and then cured to solidify it. Preferably the resin is cold-processed to avoid heat damage to the components of the NFC transponder, especially the NFC chip.

BRIEF DESCRIPTION OF DRAWINGS

An embodiment of the invention is described below, by way of example, with reference to the accompanying figures, in which.

DETAILED DESCRIPTION

The invention is exemplified in the following discussion with reference to a contactless payment ring. It will be appreciated, however, the rings in accordance with embodiments of the invention can be used for other near field communication (NFC) applications, such as ticketing on mass transit systems, operation of NFC door locks or other access systems (e.g. automotive entry systems such as for car doors), identity authentication, event/venue ticketing and the sharing of information with NFC-enabled smartphones for example.

Figure 1:
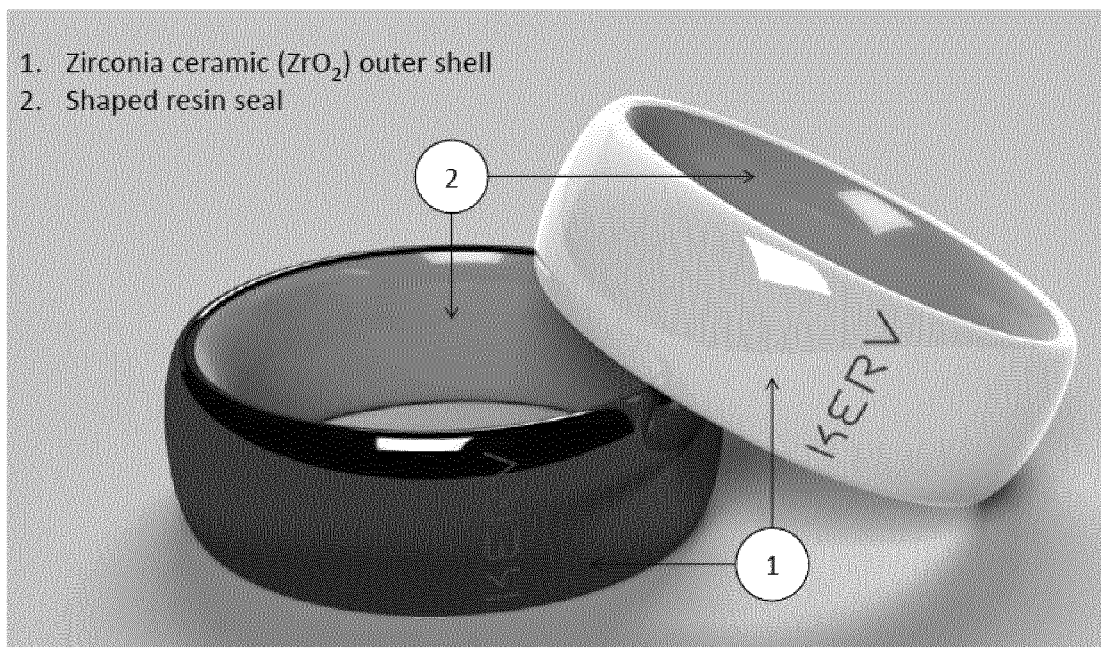
FIG. 1 shows an exterior view of a contactless payment ring in accordance with an embodiment of the present invention.

Referring to FIG. 1, the contactless payment ring includes an outer shell, which in this example is formed from a Zirconia ceramic, and an inner, shaped resin seal. An NFC transponder (not visible in FIG. 1) is encapsulated between the outer shell and the resin seal.

Figure 2:
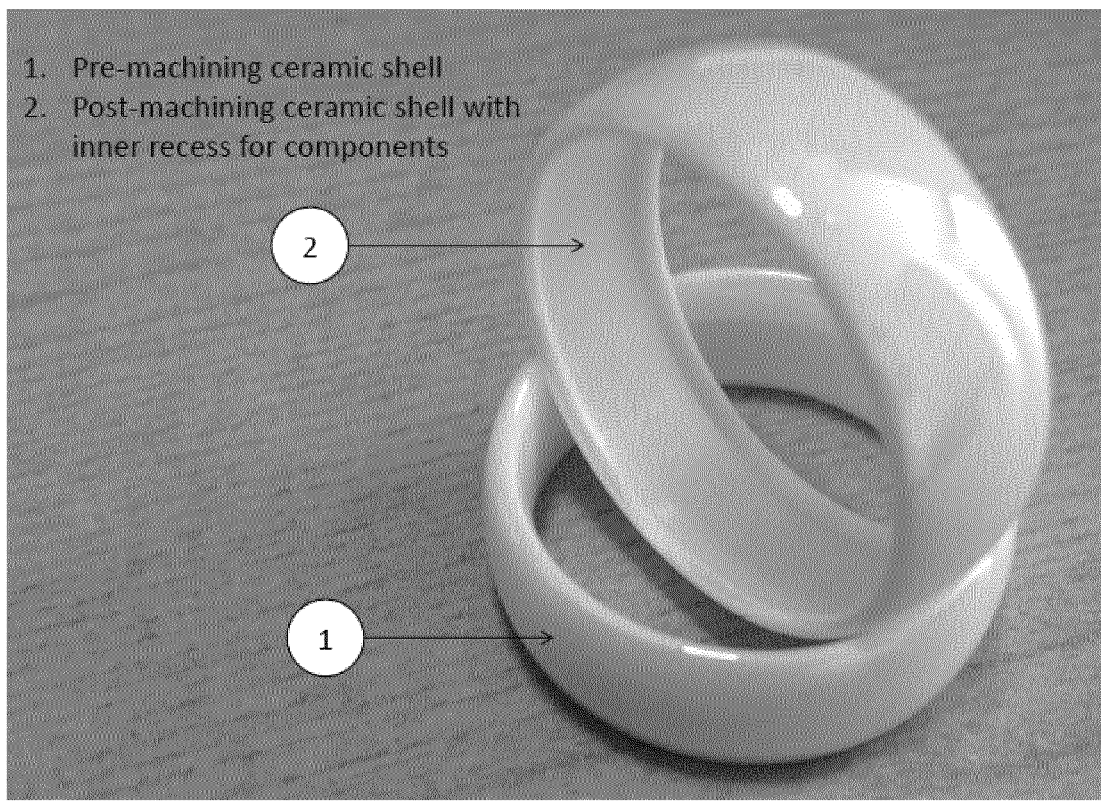
FIG. 2 shows an outer shell component of the ring of FIG. 1 in a pre-machining state (1) and in a post-machining state (2)

As best seen in FIG. 2, the outer shell is ring-shape and has a recess or annular channel extending circumferentially around its inner surface defined between lips at opposite edges of the ring. This recess/annular channel is configured to receive the NFC transponder, as discussed further below.

Figure 3:
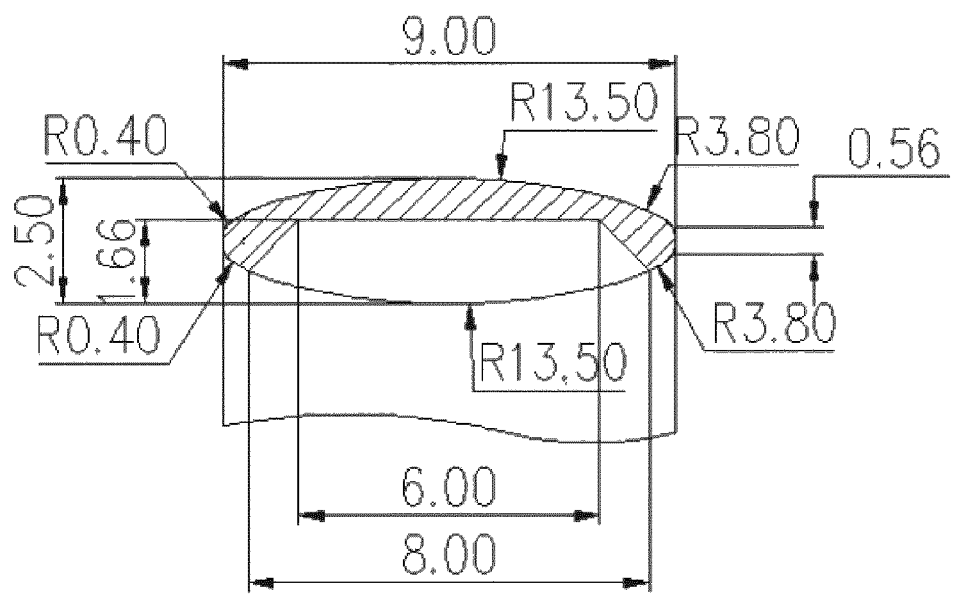
FIG. 3 shows a dimensioned cross section of the shell component of the ring of FIG. 1.

FIG. 3 shows a cross-section through the outer shell. The recess/channel and the lips at either side of the recess/channel can be clearly seen. The shaded area depicts the ceramic body of the outer shell. The dimensions on this figure are in mm. Rings can be offered in a number of different sizes without changing the cross-sectional dimensions; only the ring diameter need change.

The main components of the NFC transponder are an NFC chip and an antenna. In accordance with the present invention, the antenna is a coil (or solenoid) form antenna with multiple turns that extend around the entire internal circumference of the ring. Opposite ends of the coil antenna are connected to the chip.

Figure 4A:
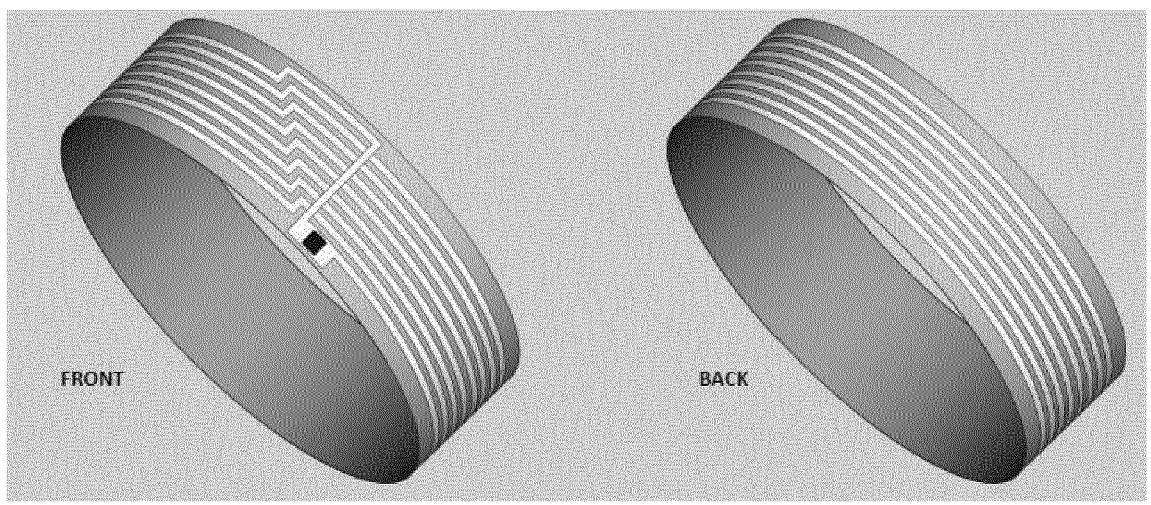
FIGS. 4(*a*), (*b*) and (*c*) show three alternative forms of coil antenna that could be used with rings in accordance with embodiments of the present invention.

One exemplary transponder construction is illustrated in FIG. 4(a). The transponder shown in this figure is formed as a flexible PCB. The turns of the coil antenna are printed or etched onto a flexible substrate in a known manner, with opposite ends of the coil being connected to the chip (see in the 'front' view).

The flexible substrate is itself formed as a cylinder, having a diameter that closely corresponds to the inner diameter of the outer shell of the ring so that it can be assembled into the recess/channel on the inside of the outer shell. Preferably the flexible substrate is pre-formed as a cylinder and the antenna track and other components of the NFC transponder are applied to the cylindrical substrate. Alternatively, the antenna track and other components of the transponder could be applied to the substrate in a flat state and the substrate could subsequently be rolled to form the cylinder, whilst ensuring that the sections of track on the substrate are appropriately aligned and joined to one another to create the continuous coil of the antenna. Especially in the latter case, the coil antenna can include a series of parallel track sections that extend circumferentially around the annular shell, with a tail end of one track section being joined to the leading end of an adjacent track section by a track step section that extends in a width direction across the annular shell (as seen in FIG. 4(a)). This makes it easier to precisely align and join the track sections when the flexible substrate is rolled into a cylinder.

Once the flexible substrate, having the antenna formed thereon and NFC chip mounted thereon, has been seated in the recess/channel of the outer shell, the resin seal can be applied over the top to encapsulate the flexible substrate, thus protecting the components of the NFC transponder from water, dirt, damage and tampering.

Figure 4B:
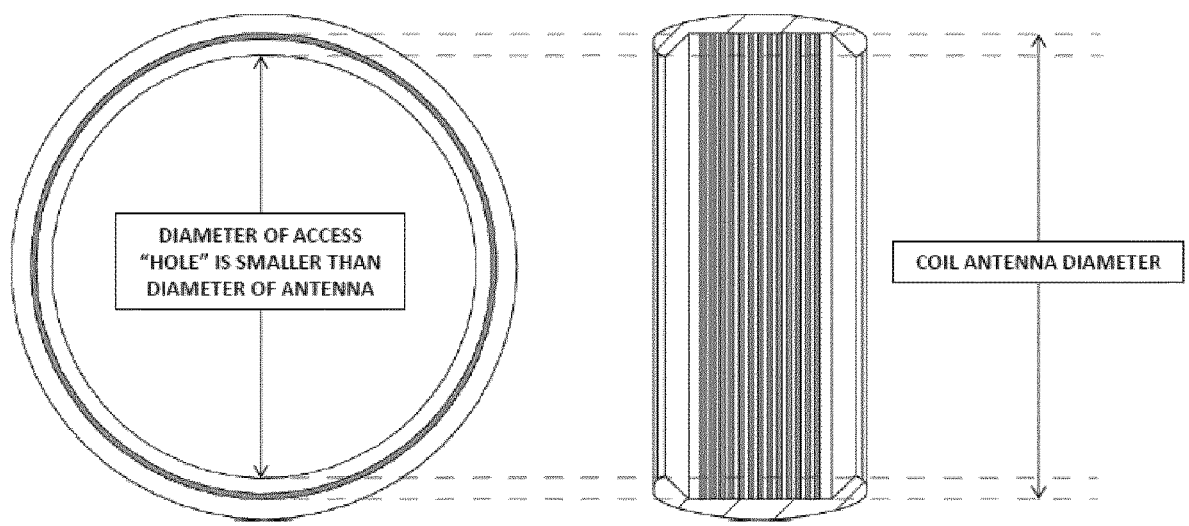
Figure 4C:
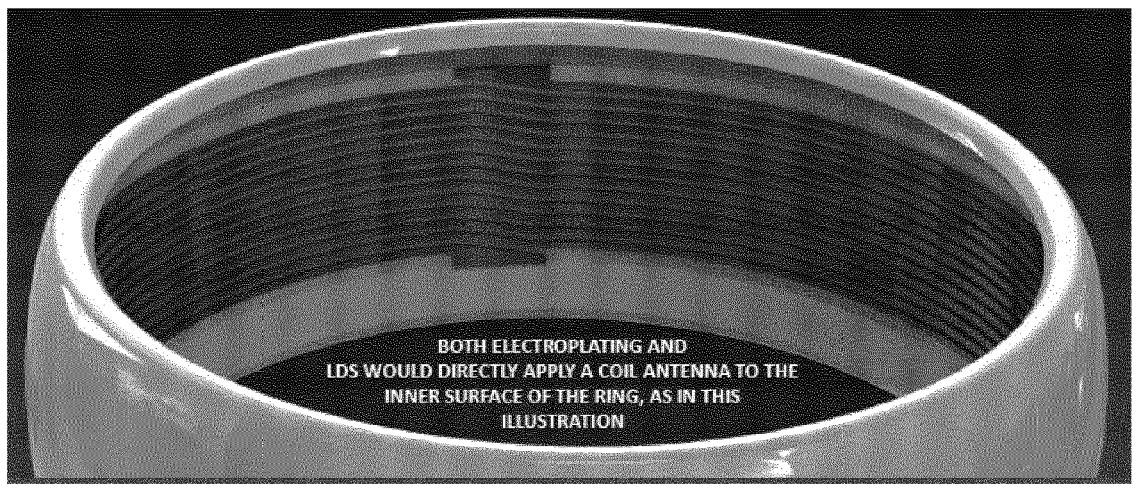

FIGS. 4(b) and 4(c) illustrate alternative approaches to forming the coil antenna. Specifically, FIG. 4(b) illustrates a simple copper wire coil. Whilst this form of coil is simple and inexpensive, it is likely to result in a bulkier ring.

FIG. 4(c) illustrates an approach in which the coil antenna is fabricated directly on the inner surface of the outer shell. The track of the antenna may, for example, be laid down on the inner surface of the shell by electroplating to selectively metalise the surface of the shell, with a laser being used, if necessary, to remove unwanted metal material. Another approach is to use laser direct structuring to metalise specific areas of a reactive plastic on the inner surface of the shell.

Figure 5:
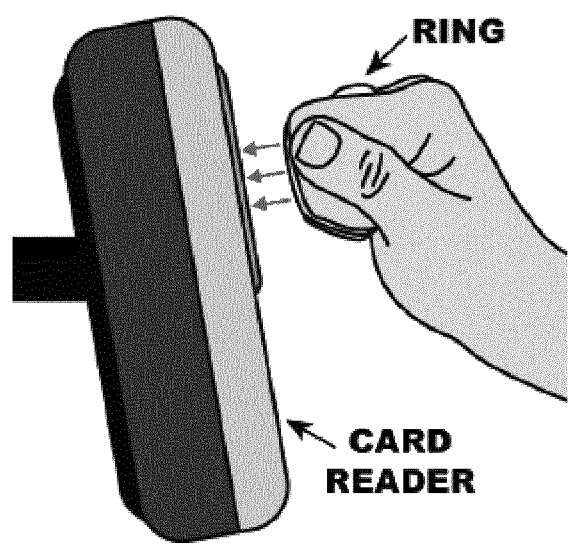
FIG. 5 illustrates the manner in which the contactless payment ring of FIG. 1 can be used to complete a transaction.

By using a coil antenna wound in the manner proposed here, the contactless payment ring can be optimally coupled to an NFC-reader (e.g. a regular contactless payment card reader) when the axis of the ring is perpendicular to the surface of the reader. This orientation is best achieved, as shown in FIG. 5, by the person wearing the ring uses a knocking-type action.

The contactless payment ring described above is one exemplary implementation of a ring in accordance with an embodiment of the invention. The skilled person will appreciate that many modifications can be made to the specifically described features within the scope of the present invention. For example, in other embodiments the ring may be large in diameter so that it can be worn as a bracelet rather than a finger ring.

The invention claimed is:

1. A ring for wearing on a finger of a user, the ring comprising:
   an annular shell including an inner surface, the inner surface of the annular shell being recessed around an inner circumference of the annular shell to form an annular channel;
   a near field communication transponder including a coil antenna etched onto a flexible substrate, wherein the flexible substrate has a cylindrical form configured to fit within the annular channel; and
   a resin seal that encapsulates the near field communication transponder and the flexible substrate within the annular channel.

2. The ring of claim 1, wherein the coil antenna includes at least 5 turns.

3. The ring of claim 1, wherein the coil antenna includes at least 8 turns.

4. The ring of claim 1, wherein the coil antenna has a plurality of turns that extend around the inner circumference of the annular shell, and wherein the plurality of turns are spaced from one another across a width of the ring.

5. The ring of claim 1, wherein the annular channel is in a center portion of the annular shell and edge portions of the annular shell extend radially inwards or outwards from one or more sides of the annular channel.

6. The ring of claim 1, wherein the annular shell is formed from a ceramic.

7. The ring of claim 1, wherein the coil antenna is etched onto a conductive track carried on the flexible substrate.

8. The ring of claim 1, wherein the near field communication transponder comprises a near field communication (NFC) chip.

9. The ring of claim 1, wherein the resin seal is constructed using a resin and a hardener.

10. The ring of claim 1, wherein the flexible substrate is pre-formed as a cylinder, and wherein the near field communication transponder is applied onto the cylinder.

11. The ring of claim 1, wherein the near field communication transponder is applied to the flexible substrate in a flat state, wherein the flexible substrate is rolled to form the cylindrical form configured to fit within the annular channel.

12. The ring of claim 1, wherein the coil antenna is etched onto the flexible substrate along a series of parallel track sections circumferentially around the flexible substrate, and wherein the parallel track sections are joined by a track step section that extends in a width direction across the flexible substrate.

13. The ring of claim 1, wherein the annular shell is carbon fiber.

14. A method of manufacturing a wearable ring, the method comprising:
   providing an annular shell including an inner surface, the inner surface of the annular shell being recessed around an inner circumference of the annular shell to form an annular channel;
   mounting a flexible substrate within the annular channel, wherein the flexible substrate has a cylindrical form configured to fit within the annular channel, and wherein the flexible substrate includes a near field communication transponder that includes a coil antenna etched onto the flexible substrate; and
   applying a resin seal over the near field communication transponder and the flexible substrate to encapsulate the near field communication transponder and the flexible substrate within the annular channel.

15. The method of claim 14, wherein the annular shell is ceramic.

16. The method of claim 14, wherein applying the resin seal comprises applying the resin seal in liquid form over the near field communication transponder and the flexible substrate after the near field communication transponder and the flexible substrate are mounted within the annular channel and curing the resin seal to solidify the resin seal.

17. The method of claim 14, wherein:
the flexible substrate is pre-formed as a cylinder; and
the method further comprises applying the near field communication transponder onto the cylinder.

18. The method of claim 14, further comprising:
applying the near field communication transponder to the flexible substrate in a flat state; and
rolling the flexible substrate to form the cylindrical form configured to fit within the annular channel.

19. The method of claim 14, wherein the coil antenna is etched onto the flexible substrate along a series of parallel track sections circumferentially around the flexible substrate, wherein the parallel track sections are joined by a track step section that extends in a width direction across the flexible substrate.

20. The method of claim 14, wherein the coil antenna includes at least 5 turns.

21. The method of claim 14, wherein the coil antenna includes at least 8 turns.

* * * * *